United States Patent
Terada et al.

(10) Patent No.: US 10,618,269 B2
(45) Date of Patent: Apr. 14, 2020

(54) METHOD OF MANUFACTURING RESIN PILLAR

(71) Applicant: TOYOTA JIDOSHA KABUSHIKI KAISHA, Aichi-ken (JP)

(72) Inventors: Shin Terada, Toyota (JP); Yoshinori Yamada, Nagakute (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 51 days.

(21) Appl. No.: 15/438,746

(22) Filed: Feb. 21, 2017

(65) Prior Publication Data

US 2017/0239883 A1 Aug. 24, 2017

(30) Foreign Application Priority Data

Feb. 24, 2016 (JP) ................................. 2016-033474

(51) Int. Cl.
| | |
|---|---|
| *B29C 64/10* | (2017.01) |
| *B33Y 10/00* | (2015.01) |
| *B29C 64/336* | (2017.01) |
| *B29C 64/106* | (2017.01) |
| *B33Y 30/00* | (2015.01) |
| *B62D 29/04* | (2006.01) |

(Continued)

(52) U.S. Cl.
CPC ............ *B33Y 10/00* (2014.12); *B29C 64/106* (2017.08); *B29C 64/336* (2017.08); *B29C 64/40* (2017.08); *B33Y 30/00* (2014.12); *B33Y 80/00* (2014.12); *B62D 25/04* (2013.01); *B62D 29/04* (2013.01); *B62D 29/043* (2013.01); *B29K 2105/08* (2013.01); *B29L 2031/30* (2013.01)

(58) Field of Classification Search
CPC ......... B29C 64/20; B29C 64/40; B29C 64/10; B62D 25/04; B29D 30/30; B29D 30/62; B05C 1/08; B33Y 30/00
See application file for complete search history.

(56) References Cited

U.S. PATENT DOCUMENTS

| | | | |
|---|---|---|---|
| 5,741,446 A | 4/1998 | Tahara et al. | |
| 9,126,365 B1 * | 9/2015 | Mark | ...................... B29C 70/20 |

(Continued)

FOREIGN PATENT DOCUMENTS

| | | | | |
|---|---|---|---|---|
| DE | 102004056075 A1 * | 5/2006 | ......... | B29C 45/0013 |
| JP | S61-087175 U | 6/1986 | | |

(Continued)

*Primary Examiner* — Jacob T Minskey
*Assistant Examiner* — Cedrick S Williams
(74) *Attorney, Agent, or Firm* — Hauptman Ham, LLP

(57) ABSTRACT

In a method of manufacturing a front pillar, a resin layer is formed by discharging a transparent resin from first nozzles of a 3D printer and discharging a supporting material from second nozzles of the 3D printer, while moving the first nozzles and the second nozzles in a direction corresponding to a length direction of a front pillar. Afterwards, the first nozzles and the second nozzles are moved relatively in a direction corresponding to a transverse direction of the front pillar and in a direction of moving away from the resin layer. By repeating the forming of the resin layer and the relative moving of the first nozzles and the second nozzles, the resin layers are layered in the direction corresponding to the transverse direction of the front pillar such that the front pillar is manufactured.

9 Claims, 9 Drawing Sheets

(51) Int. Cl.
    *B29C 64/40*    (2017.01)
    *B33Y 80/00*    (2015.01)
    *B62D 25/04*    (2006.01)
    *B29K 105/08*       (2006.01)
    *B29L 31/30*        (2006.01)

(56) References Cited

U.S. PATENT DOCUMENTS

| | | | | |
|---|---|---|---|---|
| 2003/0134130 A1* | 7/2003 | Yano | ................ | B29C 43/18 |
| | | | | 428/447 |
| 2012/0195994 A1* | 8/2012 | El-Siblani | ............. | B33Y 10/00 |
| | | | | 425/174.4 |
| 2014/0232035 A1* | 8/2014 | Bheda | ................ | B29C 64/106 |
| | | | | 264/148 |
| 2015/0151796 A1* | 6/2015 | Berger | ................. | B29C 70/68 |
| | | | | 296/193.06 |
| 2015/0252190 A1* | 9/2015 | Rodgers | ................ | C08L 79/08 |
| | | | | 524/592 |
| 2015/0367576 A1* | 12/2015 | Page | ..................... | B29C 70/30 |
| | | | | 264/257 |
| 2016/0001505 A1 | 1/2016 | Hakkaku et al. | | |
| 2016/0221611 A1* | 8/2016 | Wolf | ..................... | B62D 25/04 |
| 2017/0015060 A1* | 1/2017 | Lewicki | ................ | B29C 64/209 |
| 2017/0136698 A1* | 5/2017 | Kia | ....................... | B29C 64/106 |
| 2017/0173878 A1* | 6/2017 | Myerberg | .............. | B22F 3/008 |
| 2017/0232674 A1* | 8/2017 | Mark | .................... | B33Y 70/00 |
| | | | | 264/308 |

FOREIGN PATENT DOCUMENTS

| | | |
|---|---|---|
| JP | S64-021070 U | 2/1989 |
| JP | H09-201825 A | 8/1997 |
| JP | 2001-026283 A | 1/2001 |
| JP | 2013075661 A | 4/2013 |
| JP | 2015-151067 A | 8/2015 |
| JP | 2016-026915 A | 2/2016 |

* cited by examiner

METHOD OF MANUFACTURING RESIN PILLAR

CROSS-REFERENCE TO RELATED APPLICATION

This application claims priority under 35 USC 119 from Japanese Patent Application No. 2016-033474 filed on Feb. 24, 2016, the disclosure of which is incorporated by reference herein.

BACKGROUND

Technical Field

The present disclosure relates to a method of manufacturing a resin pillar.

Related Art

Japanese Patent Application Laid-Open (JP-A) No. H09-201825 discloses a method of manufacturing an exterior part for an automobile, such as a pillar or the like, by injection molding a resin material. Note that the structure that is disclosed in JP-A No. 2013-75661 is an example of a pillar that is made of resin.

At a pillar that is disposed at the front portion (or the rear portion) of a vehicle chamber, at the time of a front collision (or a rear collision) of the vehicle, collision load toward the vehicle rear (or the front) is inputted to the front end portion (or the rear end portion) of the pillar. Therefore, the front end portion (or rear end portion) of the pillar is displaced toward the vehicle rear (or the front), and the collision load is applied such that the length direction intermediate portion of the pillar bends convexly toward the vehicle outward. Due thereto, tensile force in the length direction of the pillar is applied to the vehicle outer side portion of the pillar. Accordingly in a method of manufacturing a resin pillar, it is desirable that the pillar that is made of resin be molded into a structure that has high tensile strength in the length direction thereof.

SUMMARY

The present disclosure provides a method of manufacturing a resin pillar that can mold a pillar that is made of resin into a structure having high tensile strength.

A first aspect of this description is related to a method of manufacturing a resin pillar that is configured to extend along a vehicle transverse direction outer end portion of a windshield glass of a vehicle. The method comprises forming a resin layer by discharging a resin material that forms the resin pillar from first nozzles of a 3D printer and discharging a supporting material from second nozzles of the 3D printer, while moving the first nozzles and the second nozzles in a direction corresponding to a length direction of the resin pillar. The method also comprises, after forming the resin layer, relatively moving the first nozzles and the second nozzles in a direction corresponding to a transverse direction of the pillar so as to move away from the resin layer, given that a direction orthogonal to a plate thickness direction of the windshield glass with respect to the length direction of the pillar is a transverse direction of the pillar. By repeating the forming of the resin layer and the relative moving of the first nozzles and the second nozzles, the resin layers are layered in the direction corresponding to the transverse direction of the resin pillar such that the resin pillar is manufactured.

In the above-described first aspect, the resin pillar is manufactured by a 3D printer. Concretely, the method of manufacturing a resin pillar includes forming a resin layer and relatively moving first nozzles and second nozzles. In the forming of the resin layer, while the first nozzles and the second nozzles of the 3D printer are moved in a direction corresponding to the length direction of the resin pillar, the resin material that forms the pillar is discharged from the first nozzles, and the supporting material is discharged from the second nozzles, and the resin layer is formed. Further, in the relative moving of the first nozzles and the second nozzles, after the forming of the resin layer, the first nozzles and the second nozzles are moved relatively in a direction corresponding to the transverse direction of the resin pillar so as to move away from the resin layer. Further, by repeating the forming of the resin layer and the relative moving of the first nozzles and the second nozzles, resin layers are layered in the direction corresponding to the transverse direction of the resin pillar, and the pillar is manufactured.

Therefore, the resin pillar that extend in the length direction of the pillar, are layered in the transverse direction of the pillar, can be molded. Accordingly, the tensile strength in the length direction of the pillar after molding can be made to be high.

In accordance with the above-described first aspect, a pillar that is made of resin can be molded into a structure that has high tensile strength.

A second aspect of the present disclosure is the method of manufacturing a resin pillar of the first aspect, wherein, in the forming of the resin layer, a water-soluble material is used as the supporting material.

In the above-described second aspect, in the forming of the resin layer, a water-soluble material is used as the supporting material. Therefore, the supporting material can be easily removed by immersing the resin pillar after molding in water. Due thereto, the resin pillar can be molded easily as compared with, for example, injection molding by which the molding of a pillar having a hollow structure is relatively difficult.

In accordance with the above-described second aspect, a resin pillar that has a hollow structure for example can be molded easily.

A third aspect of the present disclosure is the method of manufacturing a resin pillar of the second aspect, wherein the resin pillar is molded of the resin material that is transparent.

In the above-described third aspect, the resin pillar after molding is formed by the resin material that is transparent. Therefore, the resin pillar can be formed such that, when the pillar is installed in the vehicle, a passenger within the vehicle cabin can view the vehicle outer side through the pillar.

In accordance with the above-described third aspect, a pillar can be formed such that a passenger within the vehicle cabin can view the vehicle outward through the pillar after the pillar after molding is installed in the vehicle.

A fourth aspect of the present disclosure is the method of manufacturing a resin pillar of any one of the first through third aspects, wherein the resin material is a fiber reinforced resin.

In the above-described fourth aspect, because the resin material is a fiber reinforced resin, the tensile strength in the length direction of the pillar after molding can effectively be made to be high, as compared with a case in which the pillar were to be molded by injection molding. Namely, at the time of molding, by injection molding, a molded product that is made of a fiber reinforced resin, the length of the fibers of the fiber reinforced resin cannot be made to be greater than or equal to a predetermined length due to constraints in molding. Further, it is known that the length of fibers of a fiber reinforced resin can be made to be longer in a case in which a molded product that is made of a fiber reinforced resin is molded by using a 3D printer, as compared with a case of molding a molded product, that is made of a fiber reinforced resin, by injection molding. Thus, by molding the resin pillar, that is made of a fiber reinforced resin, by using a 3D printer, the fiber reinforced resin can be made to contain fibers of a long length, as compared with a case in which the pillar were to be molded by injection molding. Due thereto, the tensile strength in the length direction of the pillar after molding can effectively be made to be high.

In accordance with the above-described fourth aspect, the tensile strength in the length direction of a pillar can effectively be made to be high.

A fifth aspect of the present disclosure is the method of manufacturing a resin pillar of the second aspect, wherein one portion of the resin pillar is molded of the one selected from the group consisting of the resin material that is transparent, the resin material that is a glass fiber reinforced resin and the resin material that is a carbon fiber reinforced resin, and another portion of the resin pillar is molded of any one selected from the group, that is different from the resin material that forms the one portion of the resin pillar.

In the above-described fifth aspect, the resin material at one portion of the pillar is made to be any of a resin material that is transparent, a glass fiber reinforced resin and a carbon fiber reinforced resin. The resin material of the other portion of the pillar is made to be any of a resin material that is transparent, a glass fiber reinforced resin and a carbon fiber reinforced resin that is different from the resin material that forms the one portion of the pillar. Due thereto, resin pillars, that correspond to specifications of various types of vehicles, can be molded.

In accordance with the above-described fifth aspect, resin pillars that correspond to specifications of various types of vehicles can be molded.

Another aspect of this description is related to a method comprising discharging a first material from first nozzles of a 3D printer to form a first material layer of a vehicle pillar. The method also comprises discharging a second material, different from the first material, from second nozzles of the 3D printer, while moving the first nozzles and the second nozzles in a direction corresponding to a length direction of the vehicle pillar. The method further comprises relatively moving the first nozzles and the second nozzles in a direction corresponding to a transverse direction of the vehicle pillar different from the length direction of the vehicle pillar. By repeating the forming of the first material layer and the relative moving of the first nozzles and the second nozzles, the first material layers are layered in the direction corresponding to the transverse direction of the vehicle pillar such that the vehicle pillar is manufactured.

A further aspect of this description is related to a method, comprising discharging a first material from first nozzles of a 3D printer to form one or more first material layers to form a vehicle pillar. The method also comprises discharging a second material, different from the first material, from second nozzles of the 3D printer, while moving the first nozzles and the second nozzles in a direction corresponding to a length direction of the vehicle pillar. The method further comprises relatively moving the first nozzles and the second nozzles in a direction corresponding to a transverse direction of the vehicle pillar different from the length direction of the vehicle pillar. The first material layers are layered in the direction corresponding to the transverse direction of the vehicle pillar such that the vehicle pillar is manufactured. The second material is discharged so as to surround the one or more first layers. The second material is configured to support the one or more first layers at least during movement of the first nozzles and the second nozzles.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
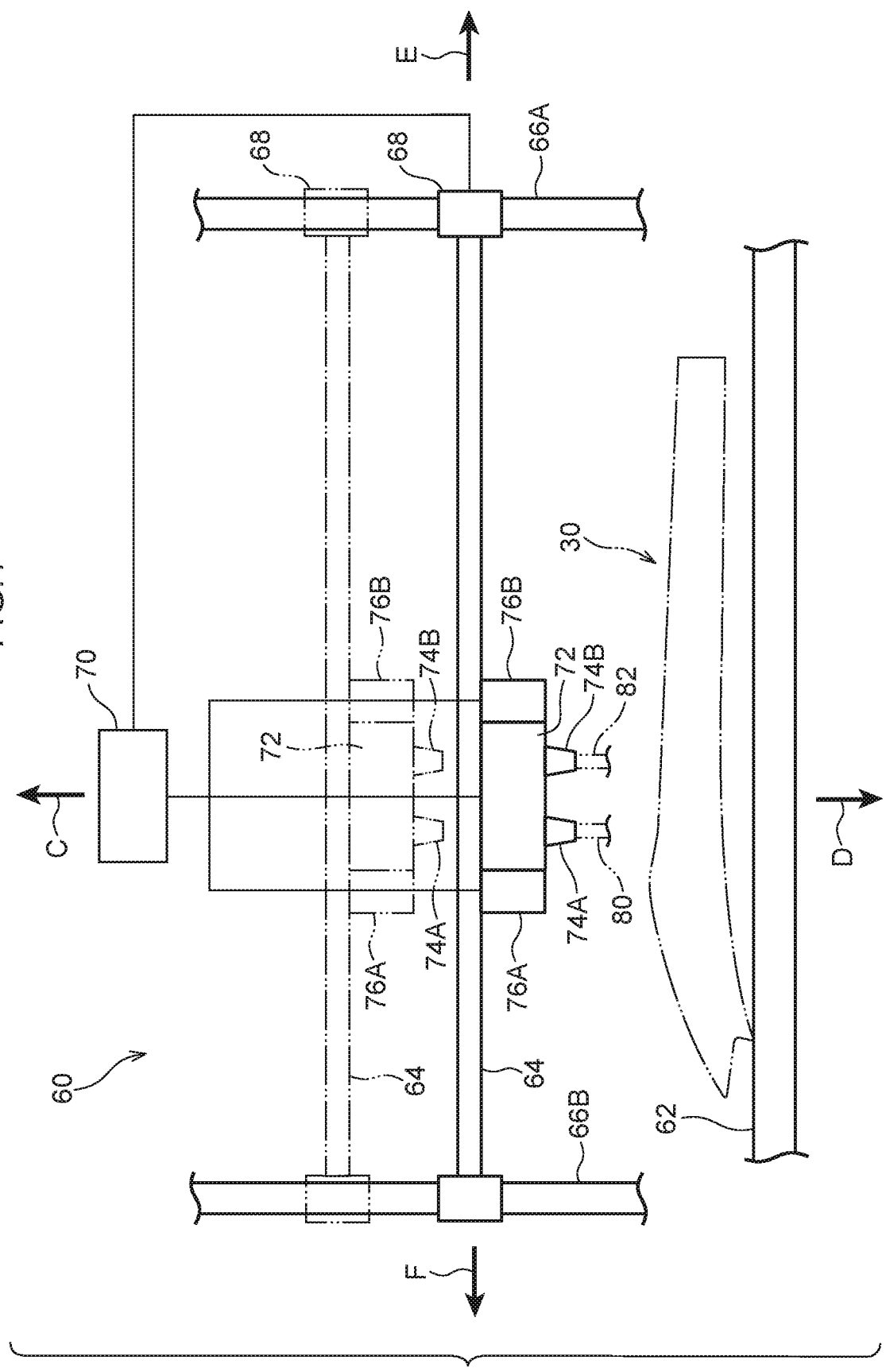
FIG. 1 is a schematic front view showing main portions of a 3D printer used in a method of manufacturing a pillar, in accordance with some embodiments.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s)

as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Pillars are often included in a vehicle at a front portion of the vehicle or at a rear portion of the vehicle. If the vehicle is subject to a front end collision, for example, a collision load is input to a front end portion of the pillar. The collision load causes the front end portion of the pillar to be displaced toward the rear portion of the vehicle. Similarly, if the vehicle is subject to a rear end collision, a collision load is input to a rear end portion of the pillar. The collision load causes the rear end portion of the pillar to be displaced toward the front portion of the vehicle. A tensile force in the length direction of the pillar is applied based on the collision load and the displacement of the front portion of the pillar or the rear portion of the pillar. For example, if the front end portion (or rear end portion) of the pillar is displaced toward the vehicle rear (or front), and the collision load is applied such that the length direction intermediate portion of the pillar bends convexly toward a direction away from the vehicle, a tensile force in the length direction of the pillar is applied to a vehicle outer-side portion of the pillar.

The following embodiments describe a method of manufacturing a pillar 30 that has a high tensile strength in the length direction thereof.

FIG. 1 is a schematic front view showing main portions of a 3D printer 60 used in a method of manufacturing the pillar 30, in accordance with some embodiments. Pillar 30 is configured to be installed in a vehicle V (see FIGS. 2-7). Hereinafter, first, a summary of the vehicle V in which the pillar 30 is installed will be described, and then, the structure of the pillar 30 will be described. Thereafter, the structure of 3D printer 60 that is used in the method of manufacturing a resin pillar will be described. For ease of discussion, FIGS. 2-7 include directional arrows. An arrow FR indicates a direction extending from the vehicle V frontward. An arrow UP indicates a direction extending from the vehicle V upward. An arrow RH indicates a direction extending from the vehicle V rightward. Hereinafter, when description is given using longitudinal, vertical and left-right directions, such directions refer to the longitudinal of the vehicle longitudinal direction, the up-down of the vehicle vertical direction, and the left and right of the vehicle left-right direction (the vehicle transverse direction), unless otherwise indicated.

For ease of discussion, vehicle V is discussed and illustrated as being an automobile. In some embodiments, vehicle V is an automobile. In some embodiments, vehicle V is one or more of an automobile, an airplane, a boat, a train car, a train engine, a capsule configured to accommodate one or more passengers or cargo, or some other suitable vessel configured to accommodate one or more passengers or cargo.

Figure 2:
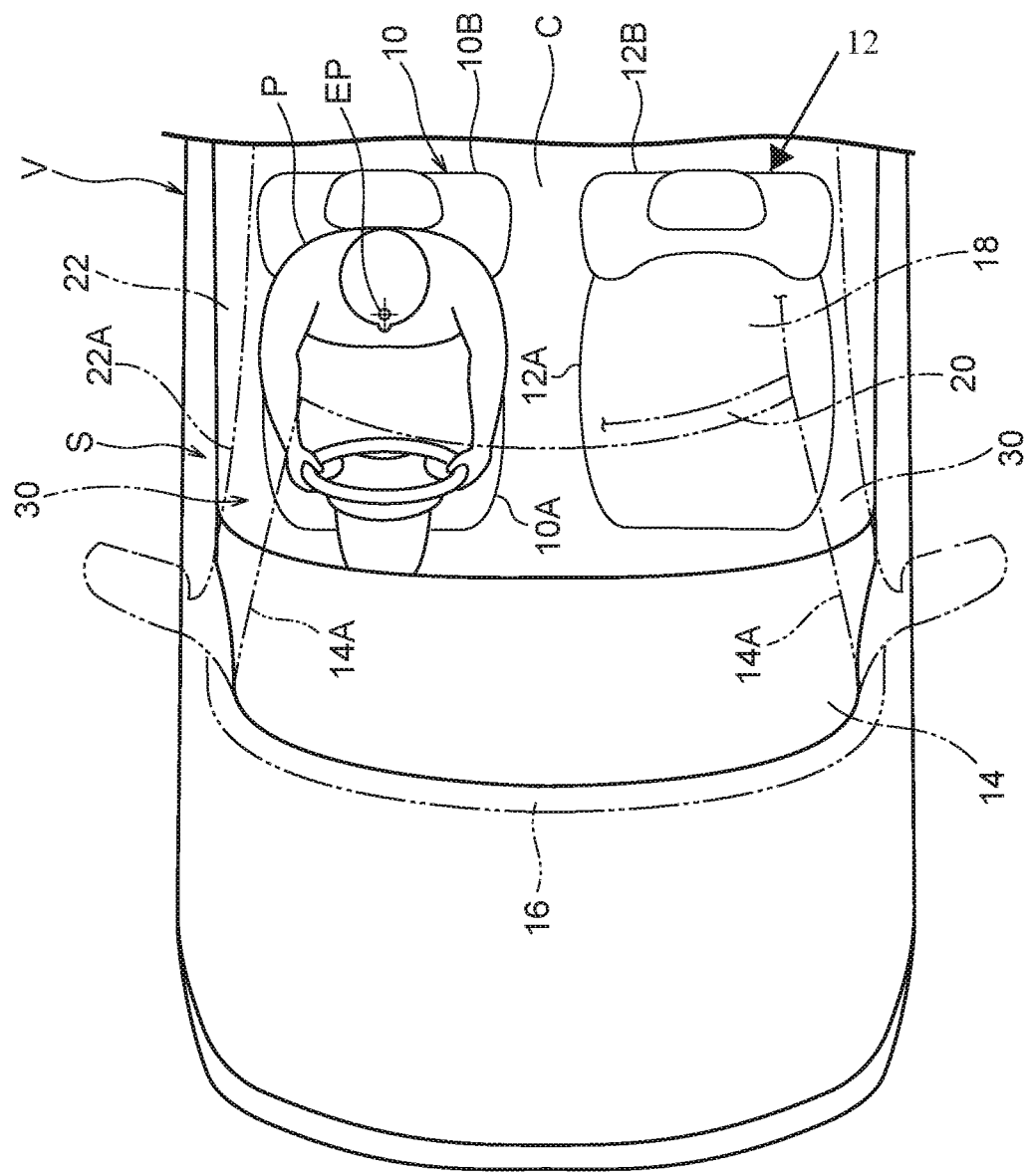
FIG. 2 is a schematic plan view showing the front portion of a cabin interior of a vehicle equipped with a pillar manufactured using a 3D printer, in accordance with some embodiments.

FIG. 2 is a schematic plan view showing the front portion of a cabin interior C of vehicle V equipped with a pillar 30 manufactured using a 3D printer, in accordance with some embodiments. Vehicle V includes vehicle seats 10 and 12. Vehicle seat 10 is a driver's seat. Vehicle seat 10 is disposed at the right portion of the front portion of the cabin C. Vehicle seat 10 includes a seat cushion 10A on which a passenger P sits, and a seatback 10B that supports the back of the passenger P. The lower end portion of the seatback 10B is connected to the rear end of the seat cushion 10A.

Vehicle seat 12 is a front passenger's seat. Vehicle seat 12 is disposed at the left portion of the front portion of the cabin C. Vehicle seat 12 includes a seat cushion 12A and a seatback 12B. Vehicle V is a right-hand-drive vehicle. In some embodiments, the driver's seat and the passenger seat are switched such that vehicle V is a left-hand-drive vehicle. In some embodiments, both seats 10 and 12 are driver's seats. In some embodiments, both seats 10 and 12 are passenger seats.

Vehicle V includes windshield glass 14 (hereinafter called "WS glass" 14) at the front end portion of the cabin C of the vehicle V. WS glass 14 is a transparent plate, and is disposed so as to be inclined upward toward the rear of the vehicle V, as seen in a side view (see FIG. 3). In some embodiments, the WS glass 14 has a curved shape at which the center thereof in the vehicle transverse direction slightly bulges-out convexly toward the front. Vehicle transverse direction outer end portions 14A of the WS glass 14 are held at first side walls 40 of the pillars 30 that are described later. The lower end of the WS glass 14 is fixed by an adhesive (not shown) to a cowl 16 that extends along the vehicle transverse direction. Note that the cowl 16 is disposed along the upper end of an unillustrated dash panel that forms the front portion of the cabin C. Further, at the front end of a roof 18 that forms the upper portion of the cabin C, the upper end of the WS glass 14 is fixed by an adhesive (not shown) to a front header 20 that is disposed along the vehicle transverse direction.

Figure 3:
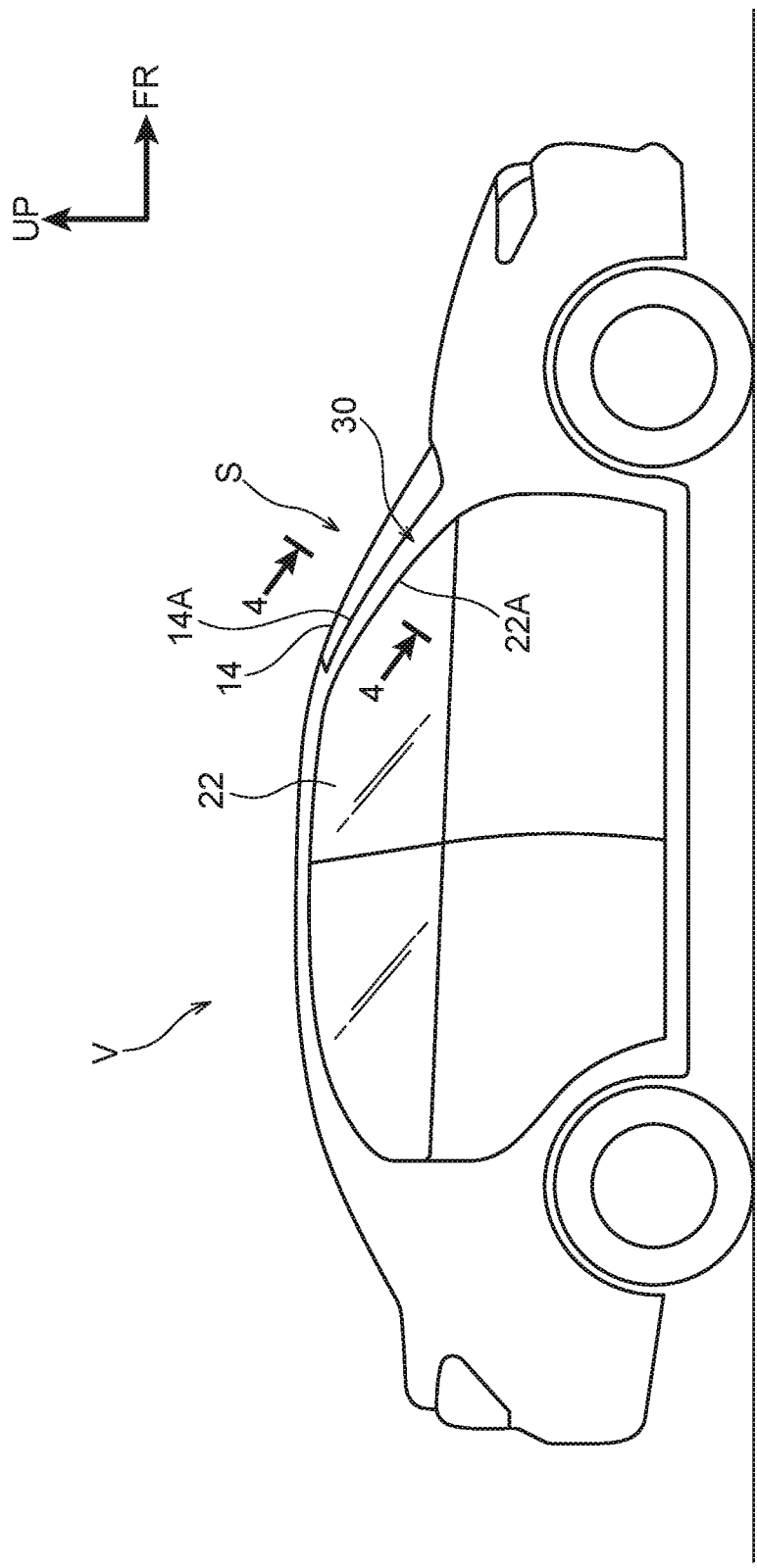
FIG. 3 is a side view of a vehicle equipped with a pillar manufactured using a 3D printer, in accordance with some embodiments.

FIG. 3 is a side view of a vehicle V equipped with a pillar 30 manufactured using a 3D printer, in accordance with some embodiments. As shown in FIG. 3, a side door glass 22 that is shaped as a transparent plate is provided at the side portion of the cabin C. The pillar 30 is disposed between a front end portion 22A of the side door glass 22 and the vehicle transverse direction outer end portion 14A of the WS glass 14. In some embodiments, a pillar 30 positioned at the front end of the vehicle V is referred to as a front pillar 30.

The front pillar 30 is described next. As shown in FIG. 2, front pillars 30 are disposed respectively at the vehicle transverse direction both sides of the WS glass 14. Further, the front pillar 30 at the driver's seat side (the right side) and the front pillar 30 at the front passenger's seat side (the left side) are formed so as to be symmetrical to the left and the right. Therefore, in the following explanation, description will be given of the front pillar 30 that is at the right side, and description of the front pillar 30 that is at the left side is omitted.

The front pillar 30 comprises a resin material. In some embodiments, the front pillar 30 is entirely comprised of a resin material. In some embodiments, the front pillar 30 at least partially comprises a material other than a resin material. Further, as described above, the front pillar 30 is disposed at the vehicle transverse direction outer side of the WS glass 14 and extends along the vehicle transverse direction outer end portion 14A of the WS glass 14. The upper end of the front pillar 30 is fixed to the front header 20 via a bracket or other suitable coupling. The lower end of the front pillar 30 is fixed to the upper end portion of a front pillar lower (not illustrated) that extends substantially in the vertical direction. In some embodiments, the front pillar lower comprises one or more of a metal, a polymer, a resin, or other suitable material.

The front pillar 30 extends along the vehicle transverse direction outer end portion 14A of the WS glass 14. Therefore, the front pillar 30 is disposed so as to be inclined upward toward the rear as seen in a side view, and is disposed at the front side and the vehicle transverse direction outer side (the right side) as seen from the passenger P. Due thereto, the field of view of the passenger P at the front side and the vehicle transverse direction outer side with respect to the front pillar 30 is blocked by the front pillar 30. In some embodiments, the front pillar 30 comprises a resin material that is transparent and configured such that the passenger P can see the vehicle outer side through the front pillar 30.

Figure 4:
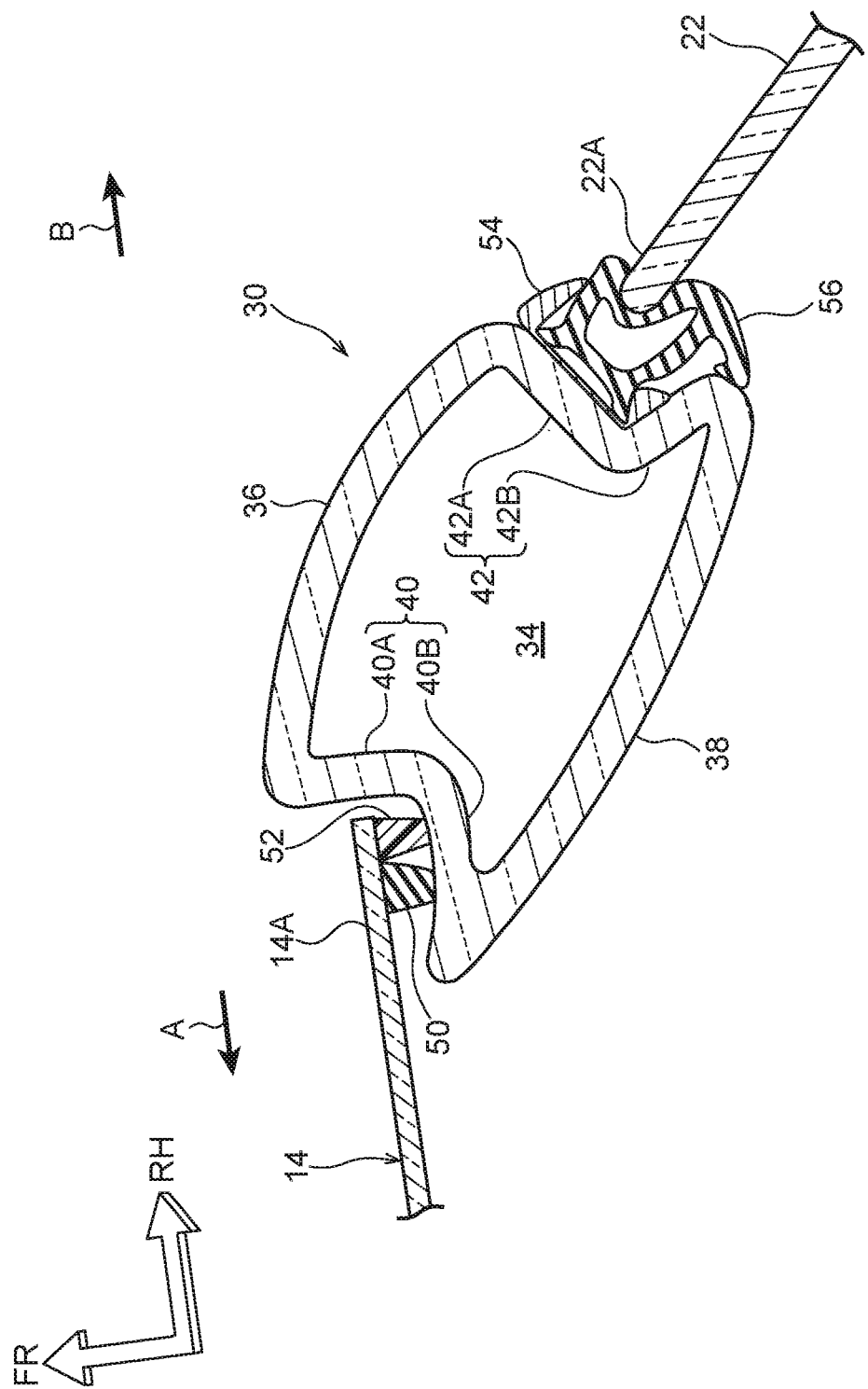
FIG. 4 is a cross-sectional view of a pillar manufactured using a 3D printer, in accordance with some embodiments.

FIG. 4 is a cross-sectional view of a pillar manufactured using a 3D printer, in accordance with some embodiments. As shown in FIG. 4, in a cross-sectional view seen from the length direction of the front pillar 30, the front pillar 30 is a hollow structure that has a closed cross-section 34. In some embodiments, the cross-section 34 of the front pillar 30 is substantially oval. In some embodiments, the cross-section 34 of the front pillar 30 is substantially trapezoidal-shaped, top-hat-shaped, or has some other suitable shape. The front pillar 30, if installed in the vehicle V, has a length direction that is substantially the vehicle transverse direction.

Figure 5:
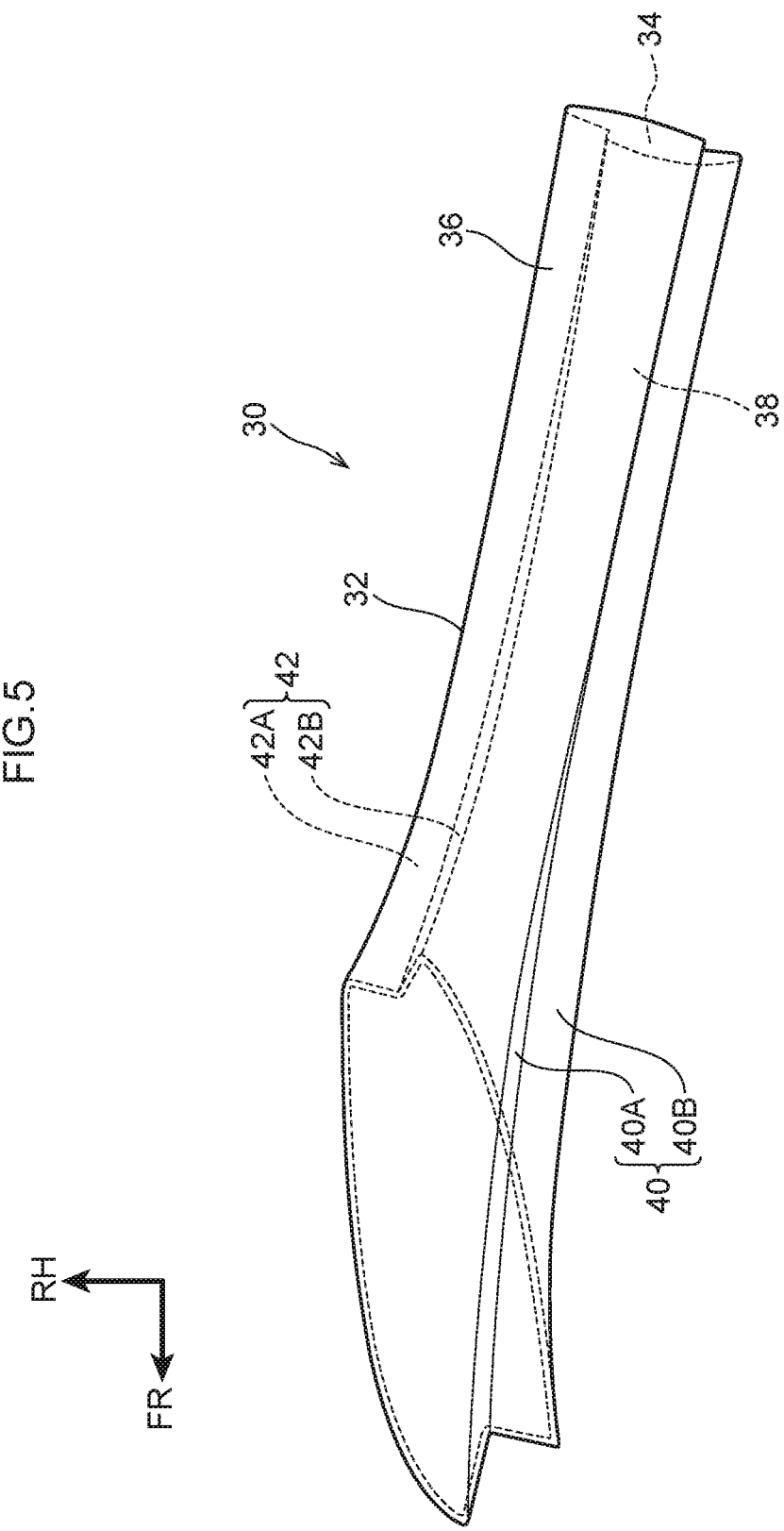
FIG. 5 is a plan view of a pillar manufactured using a 3D printer, in accordance with some embodiments.
Figure 6:
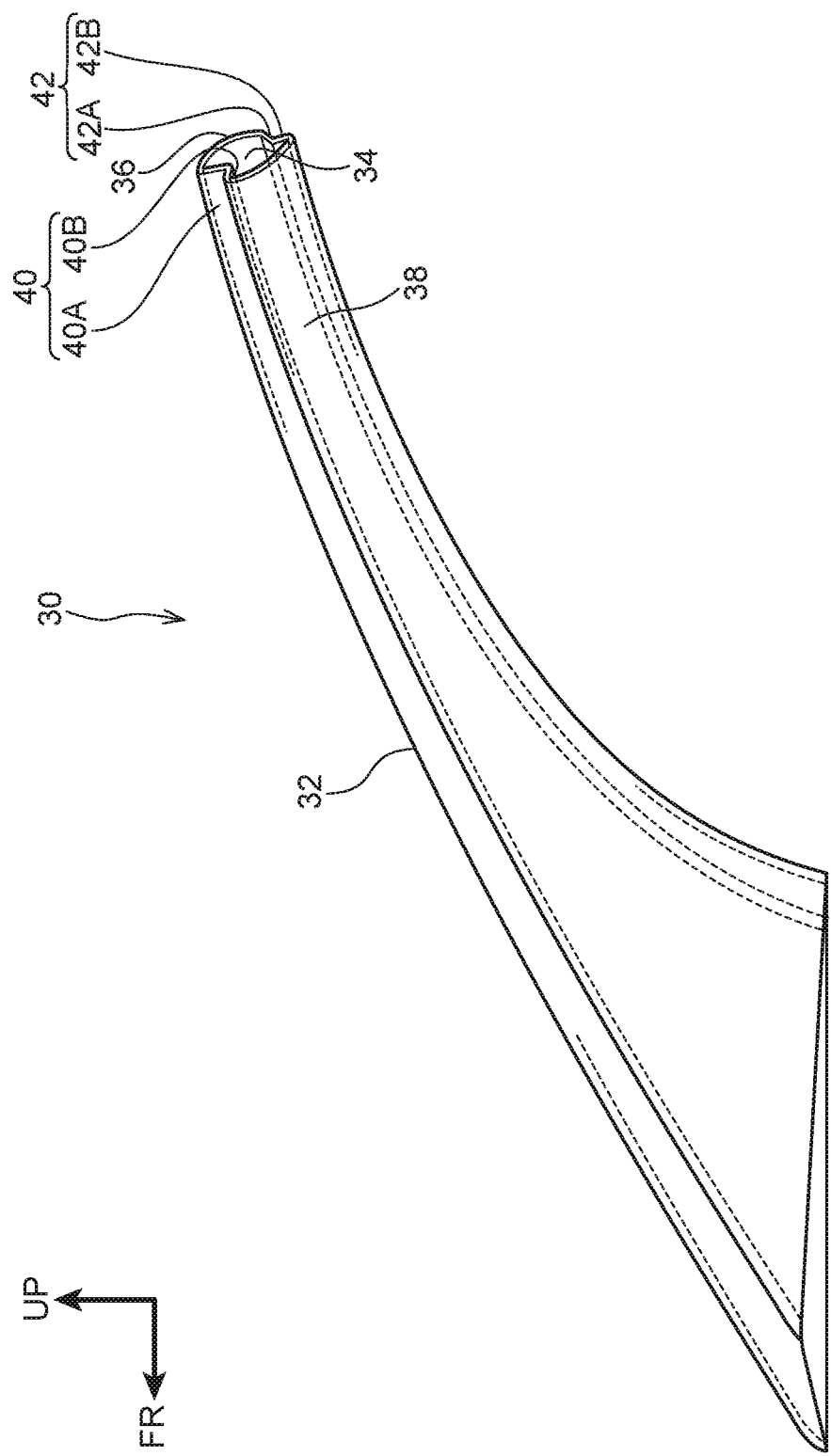
FIG. 6 is a side view of a pillar manufactured using a 3D printer, in accordance with some embodiments.

FIG. 5 is a plan view of a pillar 30 manufactured using a 3D printer, in accordance with some embodiments; FIG. 6 is a side view of a pillar 30 manufactured using a 3D printer, in accordance with some embodiments; and FIG. 7 is a front view of a pillar manufactured using a 3D printer, in accordance with some embodiments.

Figure 7:
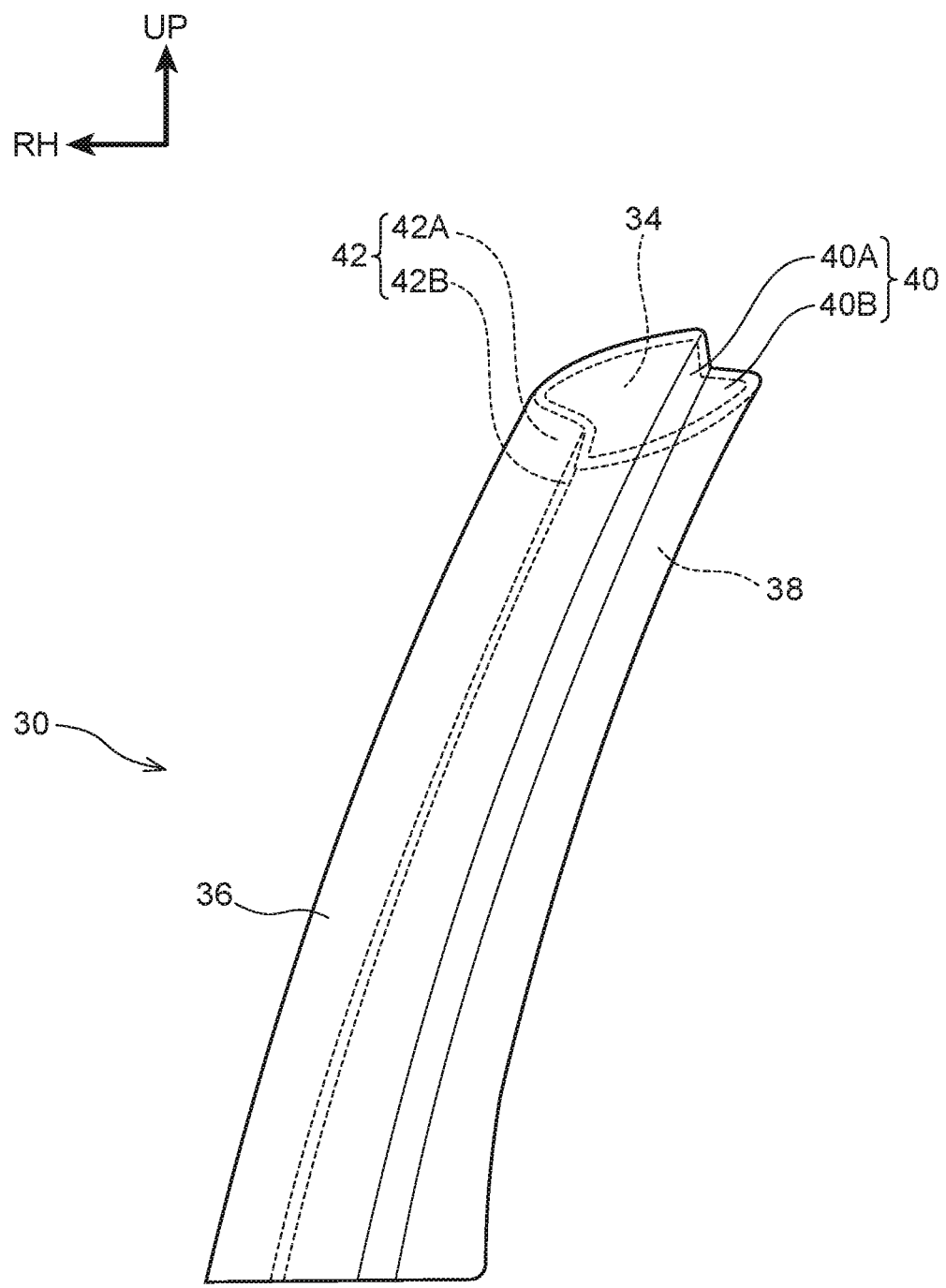
FIG. 7 is a front view of a pillar manufactured using a 3D printer, in accordance with some embodiments.

As shown in FIG. 5 through FIG. 7, the surface area of the closed cross-section 34 (i.e., the hollow portion of the front pillar 30) is formed so as to become larger toward the lower end (the front end) of the front pillar 30. The front pillar 30 is formed so as to become wider toward the lower end (the front end). Further, the front pillar 30 is formed to include an outer side wall 36 that forms the wall portion at the vehicle outer side of the front pillar 30, and an inner side wall 38 that forms the wall portion at the cabin C side of the front pillar 30. Further, the front pillar 30 has the first side wall 40 and a second side wall 42 that are a pair and that connect the outer side wall 36 and the inner side wall 38.

In a cross-sectional view seen from the length direction of the front pillar 30, the outer side wall 36 is formed in the shape of a curved surface that slightly bulges-out convexly toward the vehicle outward (i.e., toward an obliquely front right side). In a cross-sectional view seen from the length direction of the front pillar 30, the inner side wall 38 is formed in the shape of a curved surface that slightly bulges-out convexly toward the cabin C side (i.e., toward an obliquely rear left side). Further, the radii of curvature of the outer side wall 36 and the inner side wall 38 are set so as to become larger toward the lower end side (the front end side) of the front pillar 30.

As seen from the length direction of the front pillar 30, the first side wall 40 that forms the vehicle transverse direction inner side (i.e., the WS glass 14 side) of the front pillar 30 is formed in a substantially backwards L-shape that opens toward the front and the vehicle transverse direction inner side. The first side wall 40 juts-out toward the inner side of the closed cross-section 34 of the front pillar 30 with respect to the vehicle transverse direction inner ends of the outer side wall 36 and the inner side wall 38.

The wall portion that is connected to the outer side wall 36 (i.e., the wall portion that forms the vehicle outer side portion) at the first side wall 40 is a first outer side wall 40A. The wall portion that is connected to the inner side wall 38 (i.e., the wall portion that forms the cabin C side portion) at the first side wall 40 is a first inner side wall 40B. The first outer side wall 40A is disposed at the vehicle transverse direction outer side with respect to the WS glass 14 such that the plate thickness direction thereof is a direction that is substantially orthogonal to the plate thickness direction of the WS glass 14 in a cross-section seen from the length direction. The first outer side wall 40A is disposed substantially parallel to the end surface of the vehicle transverse direction outer end portion 14A of the WS glass 14. The first inner side wall 40B is disposed at the cabin C side (i.e., the rear side) with respect to the vehicle transverse direction outer end portion 14A of the WS glass 14, and is disposed so as to face the WS glass 14 in the plate thickness direction of the WS glass 14.

Here, because the front pillar 30 extends along the vehicle transverse direction outer end portion 14A of the WS glass 14, the length direction of the front pillar 30 is the extending direction of the vehicle transverse direction outer end portion 14A of the WS glass 14. The extending direction of the first side wall 40 is the length direction of the front pillar 30. Further, as seen from the length direction of the front pillar 30, the transverse direction of the front pillar 30 is a direction that is orthogonal to the plate thickness direction of the WS glass 14 (refer to the arrow A direction and the arrow B direction in FIG. 4). The arrow A direction side shown in FIG. 4 is a first transverse direction side of the front pillar 30, and the arrow B direction side is a second transverse direction side of the front pillar 30.

Returning to FIG. 4, an adhesive 50 such as a urethane sealant or the like is directly applied to a surface of the first inner side wall 40B that faces the WS glass 14. The vehicle transverse direction outer end portion 14A of the WS glass 14 is held at the first inner side wall 40B via adhesive 50. In some embodiments, the adhesive 50 is stretchable and configured to seal the region between the WS glass 14 and the front pillar 30. The stretchable adhesive helps to maintain the seal in the region between the WS glass 14 and the front pillar 30 by absorbing a difference in expansion/contraction between the WS glass 14 and the front pillar 30 caused by changes in the air temperature or other influence. Moreover, between the vehicle transverse direction outer end portion 14A of the WS glass 14 and the first inner side wall 40B, a molding 52 is disposed at a position that is at the vehicle transverse direction outer side with respect to the adhesive 50. A gap between the WS glass 14 and the first inner side wall 40B is filled-in by this molding 52.

The second side wall 42 that forms the vehicle transverse direction outer side the side door glass 22 side) of the front pillar 30 is formed in a substantial L-shape that opens toward the rear side and the vehicle transverse direction outer side as seen from the length direction of the front pillar 30. The second side wall 42 juts-out toward the inner side of the closed cross-section 34 of the front pillar 30 with respect to the vehicle transverse direction outer ends of the outer side wall 36 and the inner side wall 38. The wall portion that is connected to the outer side wall 36 at the second side wall 42 is a second outer side wall 42A. The wall portion that is connected to the inner side wall 38 at the second side wall 42 is a second inner side wall 42B.

A retainer 54 that is formed by a strip-shaped stainless steel or the like being bent is provided at the second side wall 42. The retainer 54 is formed in a substantial U-shape that opens toward the vehicle transverse direction outer side and the rear side as seen in a plan sectional view. The bottom wall of the retainer 54 is fixed to the second outer side wall 42A by unillustrated fastening members such as screws or the like. A door seal 56 is mounted to the retainer 54. The door seal 56 is formed by an elastic member of ethylene propylene rubber (EPDM) or the like. The door seal 56 is held at the second side wall 42 via the retainer 54, and the front end portion 22A of the side door glass 22 is held at the second side wall 42 via the door seal 56.

The front pillar 30 is comprises a transparent resin (in the present embodiment, for example, a fiber reinforced resin that is a resin in which glass fibers are contained in an ultraviolet curable resin such as acrylic or the like). Due thereto, the front pillar 30 is formed such that the passenger P can see the vehicle outward through the front pillar 30 (specifically, through the outer side wall 36 and the inner side wall 38). Therefore, the outer side wall 36 and the inner side wall 38 are disposed so as to overlap one another as seen from the passenger P (the driver).

Namely, although not illustrated, in a plan sectional view at the position of an eye point EP of the passenger P (shown in FIG. 2, a middle point between the both eyes of the passenger P, the central point of the line that connects the both eyes of the passenger P), the outer side wall 36 and the inner side wall 38 are disposed so as to face one another in the direction in which the eye point EP and the front pillar 30 face one another. Due thereto, there is a structure in which the passenger P can view the vehicle outer side through the portion, that is disposed between the molding 52 and the retainer 54, at the front pillar 30. The discussed position of the eye point EP of the passenger P is based on a position of the eye point EP of a dummy seated in the vehicle seat 10 that is in a driving posture. For example, an AM 50 dummy covers 50% from the small side of physiques of European and American males. In some embodiments, another suitable dummy or reference position is used for establishing the eye point EP. In some embodiments, the transmittance of the outer side wall 36 and the inner side wall 38 that are formed from a glass fiber reinforced resin is greater than or equal to 50% such that the passenger P can view the vehicle outward through the front pillar 30. In some embodiments, the transmittance of the outer side wall 36 and the inner side wall 38 that are formed from a glass fiber reinforced resin is less than 50% such that some light passes through the front pillar 30, allowing the passenger P to at least partially see through the front pillar 30. In some embodiments, the transmittance of the outer side wall 36 and the inner side wall 38 that are formed from a glass fiber reinforced resin is less than 50% such that nearly no light, or no light, passes through the front pillar 30.

Returning to FIG. 1, the structure of the 3D printer 60 that is used in a method of manufacturing the front pillar 30 is described next.

Main portions of the 3D printer 60 are shown in a schematic front view in FIG. 1. Note that arrow C in FIG. 1 indicates the device upward of the 3D printer 60, and arrow D in FIG. 1 indicates the device downward of the 3D printer 60. Arrow E and arrow F shown in FIG. 1 indicate the device transverse direction of the 3D printer 60. Further, the device vertical direction coincides with the transverse direction of the front pillar 30 after molding by the 3D printer 60, and the device transverse direction coincides with the length direction of the front pillar 30 after molding. Note that, in FIG. 1, in order to make the disposed state of the front pillar 30 after molding that is within the 3D printer 60 easy to understand, the front pillar 30 after molding is shown by the two-dot chain line. Further, a supporting material 82 that is described later is omitted in FIG. 1.

The 3D printer 60 has a pedestal 62 that is substantially elongated plate shaped. This pedestal 62 is disposed with the device vertical direction being the plate thickness direction thereof, and extends in the device transverse direction. The pedestal 62 is fixed to the housing of the 3D printer 60 at unillustrated positions. A first rail 64 is provided at the device upward of the pedestal 62, and the first rail 64 extends in the device transverse direction. One length direction end portion of the first rail 64 is movably connected, via a moving device 68, to a second rail 66A that extends in the device vertical direction. The other length direction end portion of the first rail 64 is movably supported at a second rail 66B that extends in the device vertical direction. The moving device 68 is electrically connected to a control section 70. This is a structure in which, due to the moving device 68 being operated by the control section 70, the first rail 64 moves in the device vertical direction along the length directions of the second rails 66A, 66B (refer to the first rail 64 shown by the two-dot chain line in FIG. 1).

A nozzle head 72 is movably connected to the first rail 64. Due thereto, this is a structure in which, due to the moving device 68 operating and the first rail 64 being moved along the second rails 66A and 66B, the nozzle head 72 moves along the device vertical direction (i.e., the direction corresponding to the transverse direction of the front pillar 30 after molding). The nozzle head 72 has a driving section (not illustrated) that moves the nozzle head 72 along the length direction of the first rail 64, and the driving section is electrically connected to the control section 70. Further, this is a structure in which the driving section is operated by control of the control section 70, and the nozzle head 72 moves reciprocally along the length direction of the first rail 64 (i.e., the direction corresponding to the length direction of the front pillar 30 after molding).

Further, plural first nozzles 74A are provided at the nozzle head 72. (In FIG. 1, only one of the first nozzles 74A is illustrated.) The first nozzles 74A project-out from the nozzle head 72 toward the device downward, and are disposed so as to be lined-up in the longitudinal direction of the 3D printer 60 (the direction orthogonal to the surface of the drawing that is FIG. 1). The first nozzles 74A discharge a transparent resin 80 that is in liquid form, and mold the front pillar 30. Due to control of the control section 70, the transparent resin 80 is discharged appropriately toward the device downward (the pedestal 62 side) from the first nozzles 74A.

Further, plural second nozzles 74B are provided at the nozzle head 72 at positions that are at one side in the device transverse direction (the arrow E direction side in FIG. 1) with respect to the first nozzles 74A. (In FIG. 1, only one of the second nozzles 74B is illustrated.) The second nozzles 74B project-out from the nozzle head 72 toward the device downward, and are disposed so as to be lined-up in the longitudinal direction of the 3D printer 60. The second nozzles 74B are formed so as to discharge the supporting material 82. The supporting material 82 is a material for supporting from the device downward the portion, that is formed by the transparent resin 80, at a resin layer 84 (see FIG. 8) that is described later, at the time of layering the resin layer 84. Further, due to control of the control section 70, the supporting material 82 is discharged appropriately from the second nozzles 74B toward the device downward (the pedestal 62 side). Note that the supporting material 82 is a water-soluble material (e.g., a material such as PVA (polyvinyl alcohol) or the like).

Further, a pair of UV lamps 76A and 76B is provided at the device transverse direction both sides of the nozzle head 72. Due thereto, there is a structure in which the UV lamps 76A, 76B move reciprocally along the first rail 64 together with the nozzle head 72. The UV lamps 76A, 76B are electrically connected to the control section 70, and there is a structure in which the UV lamps 76A, 76B irradiate ultraviolet rays toward the device downward due to control of the control section 70.

Three-dimensional shape data of the front pillar 30 is stored in the control section 70. On the basis of this three-dimensional shape data, the control section 70 operates (the driving section of) the nozzle head 72, the first nozzles 74A, the second nozzles 74B and the moving device 68 so as to mold the front pillar 30. In further detail, the control section 70 converts the three-dimensional shape data into plural cross-sectional shape data (slice data) of the front pillar 30, and, on the basis of this slice data, the control section 70 operates (the driving section of) the nozzle head 72, the first nozzles 74A, the second nozzles 74B and the moving device 68. Note that the slice data is cross-sectional shape data at the time when the front pillar 30 is cut along an orthogonal plane VS (refer to the two orthogonal planes VS shown by the solid lines in FIG. 8) that is orthogonal to the transverse direction of the front pillar 30. Further, the slice data is data at the time of cutting the front pillar 30 each predetermined interval (e.g., 40 μm) in the transverse direction of the front pillar 30. In the following description, the number that is appended to the slice data represents the order of the slice data from one transverse direction side of the front pillar 30. Note that, in FIG. 8, for convenience, the interval between the orthogonal planes VS is illustrated in an exaggerated manner.

Operation of the present embodiment is described next while the method of manufacturing the front pillar 30 is explained.

In the method of manufacturing the front pillar 30, the nozzle head 72 is reciprocally moved in the length direction of the first rail 64 (i.e., the direction corresponding to the length direction of the front pillar 30 after molding). Further, on the basis of the slice data, the transparent resin 80 is discharged from the first nozzles 74A, and the supporting material 82 is discharged from the second nozzles 74B such that the resin layer 84 is formed. The front pillar 30 is molded due to this resin layer 84 being layered at the device upward (i.e., the direction corresponding to the transverse direction of the front pillar 30 after molding).

The control section 70 drives the driving section of the nozzle head 72, and moves the nozzle head 72, the first nozzles 74A and the second nozzles 74B along the length direction of the first rail 64 toward one side in the device transverse direction (the arrow E direction side in FIG. 1, one side in the direction corresponding to the length direction of the front pillar 30 after molding). At this time, on the basis of slice data 1, the control section 70 discharges, from the first nozzles 74A, the transparent resin 80 that is in a liquid form onto the portion that corresponds to the cross-sectional shape of the front pillar 30, and discharges, from the second nozzles 74B, the supporting material 82 onto the portions other than the portion corresponding to the cross-sectional shape of the front pillar 30. Further, at the time of movement of the nozzle head 72, the control section 70 operates the UV lamp 76A, and irradiates ultraviolet rays onto the transparent resin 80 that has been discharged, and cures the transparent resin 80. Due thereto, the first resin layer 84 (see FIG. 8) is formed (first step). Note that, in this first step, setting is carried out such that the transparent resin 80 is discharged from the first nozzles 74A and the supporting material 82 is discharged from the second nozzles 74B, such that the thickness of the resin layer 84 becomes 40 μm.

Then, after the first step is completed, the control section 70 operates the moving device 68, and moves the nozzle head 72 toward the device upward (second step). Note that, in the second step, the amount of movement of the nozzle head 72 toward the device upward (the feeding pitch) is set to be the same as the thickness of the resin layer 84.

Then, after the second step is completed, the process returns to the first step where the control section 70 drives the driving section of the nozzle head 72, and moves the nozzle head 72, the first nozzles 74A and the second nozzles 74B along the length direction of the first rail 64 toward the other side in the device transverse direction (the arrow F direction side in FIG. 1, the other side in the direction corresponding to the length direction of the front pillar 30 after molding). At this time, on the basis of slice data 2, the control section 70 discharges, from the first nozzles 74A, the transparent resin 80 that is in a liquid form onto the portion that corresponds to the cross-sectional shape of the front pillar 30, and discharges, from the second nozzles 74B, the supporting material 82 onto the portions other than the portion corresponding to the cross-sectional shape of the front pillar 30. Further, at this time, the control section 70 operates the UV lamp 76B, and irradiates ultraviolet rays onto the transparent resin 8C) that has been discharged, and cures the transparent resin 80. Due thereto, the second resin layer 84 is formed at the upward of the first resin layer 84. Then, after the first step is completed, the process moves on to the second step, and the nozzle head 72 is moved toward the device upward.

Figure 8:
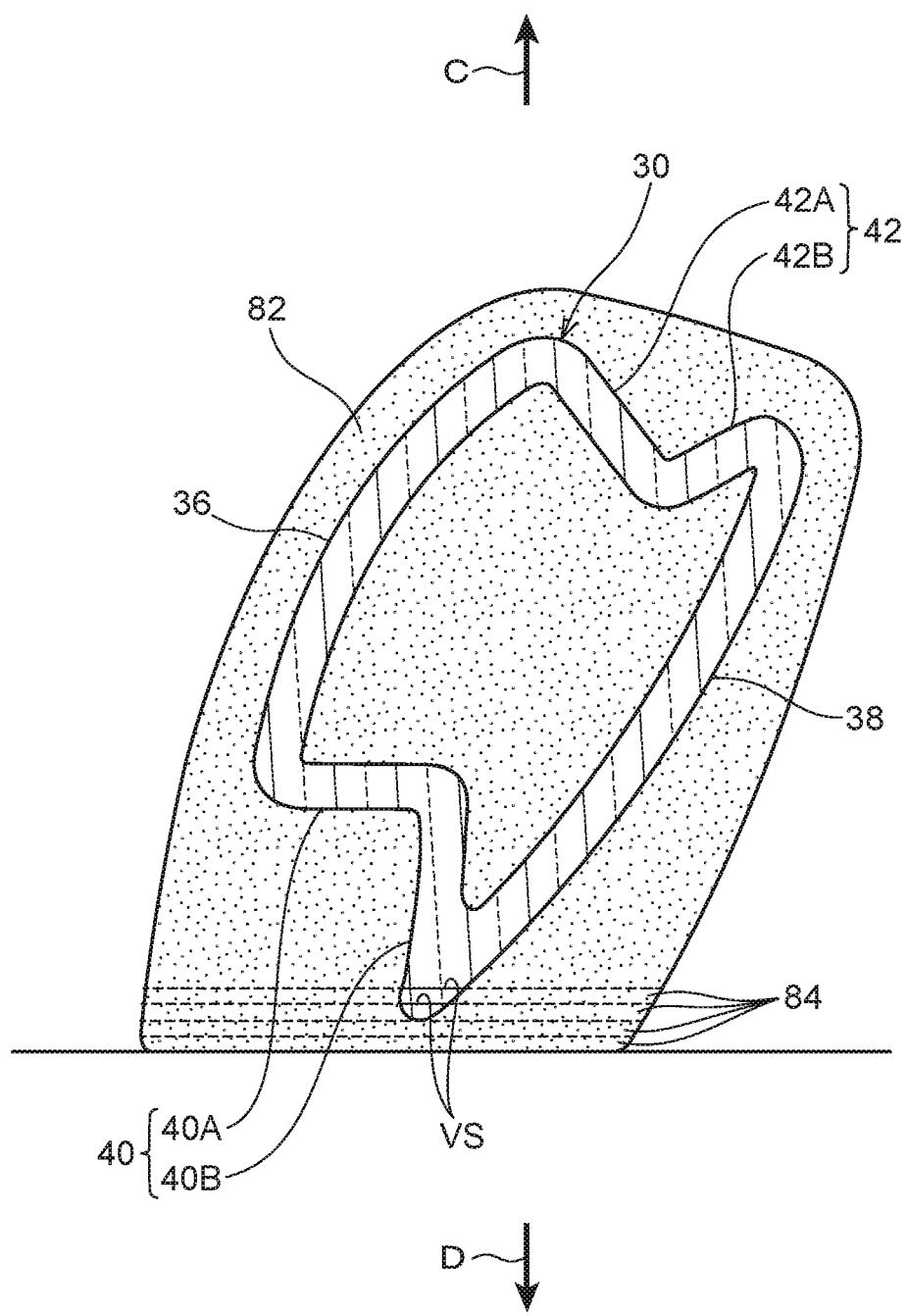
FIG. 8 is a cross-sectional view of a pillar manufactured using a 3D printer after a molding process, in accordance with some embodiments.

By repeatedly carrying out the first step and the second step, as shown in FIG. 8, the front pillar 30, that has the plural resin layers 84 (in FIG. 8, only four of the resin layers 84 are shown) that are layered in the device vertical direction, is molded. The front pillar 30 is molded by being successively molded from the first side wall 40 and the inner side wall 38 at the vehicle transverse direction inner side. Further, at this time, the portion that is formed by the transparent resin 80 at the resin layer 84 is supported from the device downward by the portion that is formed by the supporting material 82 at the resin layer 84. Namely, in the state after the front pillar 30 has been molded by the 3D printer 60, the supporting material 82 (refer to the portions shown by the dots in FIG. 8) is joined to the outer peripheral portion and the inner peripheral portion of the front pillar 30. Therefore, for example, the front pillar 30 is immersed in water, and the supporting material 82 is dissolved and removed from the front pillar 30. The front pillar 30 that has a hollow structure is thereby molded.

In this way, in the present embodiment, in the first step, while the first nozzles 74A and the second nozzles 74B of the 3D printer 60 are moved in the transverse direction of the 3D printer 60 (i.e., the direction corresponding to the length direction of the front pillar 30), the transparent material 80 is discharged from the first nozzles 74A, and the supporting material 82 is discharged from the second nozzles 74B such that the resin layers 84 are formed. Further, in the second step, after the first step, the first nozzles 74A and the second nozzles 74B are moved relative to the resin layer 84 toward the device upward of the 3D printer 60 (a direction corresponding to the transverse direction of the front pillar 30). Then, by repeatedly carrying out the first step and the second step, the resin layers 84 are layered in the direction corresponding to the transverse direction of the front pillar 30 such that the front pillar 30 is manufactured. Therefore, the front pillar 30, that is made of resin and has a structure in which the plural resin layers 84 that extend in the length direction of the front pillar 30, are layered in the transverse direction of the front pillar 30, can be molded. Accordingly, the tensile strength, in the length direction, of the front pillar 30 after molding can be made to be high.

Further, as described above, the front pillar 30 is molded due to the resin layers 84 being layered in the transverse direction of the front pillar 30. Therefore, the molding time of the front pillar 30 can be shortened as compared with a case in which the front pillar 30 were to be molded by the resin layers 84 being layered in the length direction of the front pillar 30.

Further, the front pillar 30 has a hollow structure that has the closed cross-section 34, and, in the first step, the resin layer 84 is formed and layered by using the supporting material 82 that is water-soluble. Therefore, as described above, the supporting material 82 can be easily removed from the front pillar 30 by immersing the front pillar 30 in water. Accordingly, the front pillar 30, that has a hollow structure and that is usually difficult to mold by injection molding, can be molded easily.

Further, the front pillar 30 is formed from a glass fiber reinforced resin that is transparent. In other words, the outer side wall 36 and the inner side wall 38 of the front pillar 30 are formed of a glass fiber reinforced resin that is transparent. Therefore, the passenger P within the cabin C can view outward from the vehicle through the outer side wall 36 and the inner side wall 38.

Further, the front pillar 30 that is made of a fiber reinforced resin is molded by using the 3D printer 60, which results in the front pillar 30 having a higher tensile strength than a pillar formed by way of an injection molding process. If a molded product is made of a fiber reinforced resin by way of injection molding, the length of the fibers of the fiber reinforced resin cannot be made to be greater than or equal to a predetermined length, and the length of the fibers of the reinforced resin is limited due to constraints in the injection molding process. However, the discussed 3D printing process for molding the front pillar 30, for example by using the 3D printer 60, makes it possible to lengthen the fibers of a fiber reinforced resin molded product compared to a fiber reinforced resin molded product that is made by way of injection molding. Accordingly, by molding the front pillar 30 using the 3D printer 60, the fiber reinforced resin can be made to contain fibers having a longer length than a pillar molded by way of injection molding. As such, the tensile strength in the length direction of the front pillar 30 after molding using the 3D printer 60 is higher than the tensile strength in a pillar made by way of injection molding.

Moreover, as described above, in the first step of the method of manufacturing the front pillar 30, the resin layer 84 is formed by the first nozzles 74A being moved in a direction corresponding to the length direction of the front pillar 30. Therefore, the direction of the fibers of the fiber reinforced resin is made to coincide with the length direction of the front pillar 30. In injection molding, however, it is difficult to control the direction of the fibers of the fiber reinforced resin to be in a predetermined direction such as the length direction of the pillar. Namely, in injection molding, the fibers of the fiber reinforced resin tend to be arranged in a direction that runs along the direction of flowing of the molten resin. Further, the direction of the flowing of the resin is defined by results from the position and the number of the gates of the mold, and the like. Therefore, there are cases in which the direction of the fibers of the fiber reinforced resin is affected by the structure of the mold, and the resulting fibers do not coincide with the desired direction (e.g., the length direction of the pillar). In other words, in injection molding, it is relatively difficult to control the direction of the fibers of the fiber reinforced resin to become a predetermined direction.

In contrast, in a case in which the front pillar 30 that is made of a fiber reinforced resin is molded by using the 3D printer 60, the fiber reinforced resin is discharged from the first nozzles 74A while the first nozzles 74A are moved. Therefore, the fibers of the fiber reinforced resin tend to be arranged substantially along the direction of movement of the first nozzles 74A. Thus, by moving the first nozzles 74A in the direction in which it is desired to set the direction of the fibers of the fiber reinforced resin, the fibers of the fiber reinforced resin can be arranged in the desired direction. Due thereto, it is easy to make the direction of the fibers of the fiber reinforced resin coincide with the length direction of the front pillar 30, as compared with a case in which a pillar is molded by way of injection molding. As described above, the resin layer 84 is formed by moving the first nozzles 74A in a direction corresponding to the length direction of the front pillar 30. Therefore, the fibers of the fiber reinforced material can be arranged in a direction that causes the fibers to effectively contribute to the tensile strength of the front pillar 30. Accordingly, the tensile strength of the front pillar 30 in the length direction is effectively greater than a pillar formed by way of injection molding.

In some embodiments, the front pillar 30 is a hollow structure that has the closed cross-section 34, as discussed above. In some embodiments, the front pillar 30 is a solid structure. In some embodiments, one or more portions of the front pillar 30 are solid in cross-section along a length of the front pillar 30 and one or more other portions of the front pillar 30 have a hollow structure along the length of the front pillar 30.

The pedestal 62 of the 3D printer 60 is immobile, and the nozzle head 72 (the first nozzles 74A and the second nozzles 74B) are movable in the device vertical direction. In some embodiments, the pedestal 62 is movable in the device vertical direction, and the nozzle head 72 (the first nozzles 74A and the second nozzles 74B) are immobile in the device vertical direction. In some embodiments, the first rail 64 is fixed to the second rails 66A, 66B. In this case, in the second step of the method of manufacturing the front pillar 30, the pedestal 62 is moved toward the device downward with respect to the nozzle head 72 (the first nozzles 74A and the second nozzles 74B). Due thereto, in this case as well, the nozzle head 72 (the first nozzles 74A and the second nozzles 74B) are moved relatively toward the device upward with respect to (in the direction of moving away from) the resin layers 84.

In the first step, the resin layers 84 are layered each time the nozzle head 72 (the first nozzles 74A and the second nozzles 74B) is moved reciprocally in the device transverse direction. In some embodiments, the resin layers 84 are layered by discharging the transparent resin 80 from the first nozzles 74A and discharging the supporting material 82 from the second nozzles 74B, only at times when the nozzle head 72 (the first nozzles 74A and the second nozzles 74B) are moved toward a device transverse direction one side (or the device transverse direction other side). In this case, in the first step, a structure is formed in which the resin layer 84 is formed by moving the nozzle head 72 (the first nozzles 74A and the second nozzles 74B) toward a device transverse direction one side (or the device transverse direction other side), and thereafter, the nozzle head 72 is moved to its initial position that is before the start of movement, and thereafter the process moves onto the second step.

In some embodiments, forming a resin layer by discharging a resin material from first nozzles and discharging a supporting material from second nozzles, while moving the first nozzles and the second nozzles in a direction corresponding to the length direction of the pillar comprises a case in which, while the first nozzles 74A and the second nozzles 74B are moved reciprocally in the direction corresponding to the length direction of the front pillar 30, the transparent resin 80 is discharged from the first nozzles 74A and the supporting material 82 is discharged from the second nozzles 74B. In some embodiments, forming a resin layer by discharging a resin material from first nozzles and discharging a supporting material from second nozzles, while moving the first nozzles and the second nozzles in a direction corresponding to the length direction of the pillar comprises a case in which, while the first nozzles 74A and the second nozzles 74B are moved toward one side or toward the other side in the direction corresponding to the length direction of the front pillar 30, the transparent resin 80 is discharged from the first nozzles 74A and the supporting material 82 is discharged from the second nozzles 74B.

In some embodiments, the entire front pillar 30 comprises a glass fiber reinforced resin that is transparent, as described above. In some embodiments, the entire front pillar 30 comprises one or more of a resin material that is transparent, a glass fiber reinforced resin that is transparent, a carbon fiber reinforced resin that is black, or some other suitable material. In some embodiments, the entire front pillar 30 comprises a resin that is transparent and is free from containing fibers. In some embodiments, the entire front pillar 30 comprises a resin that is black and is free from containing fibers. In some embodiments, the entire front pillar 30 comprises material other than resin that is transparent and is free from containing fibers. In some embodiments, the entire front pillar 30 comprises material other than resin that is black and is free from containing fibers.

Figure 9:
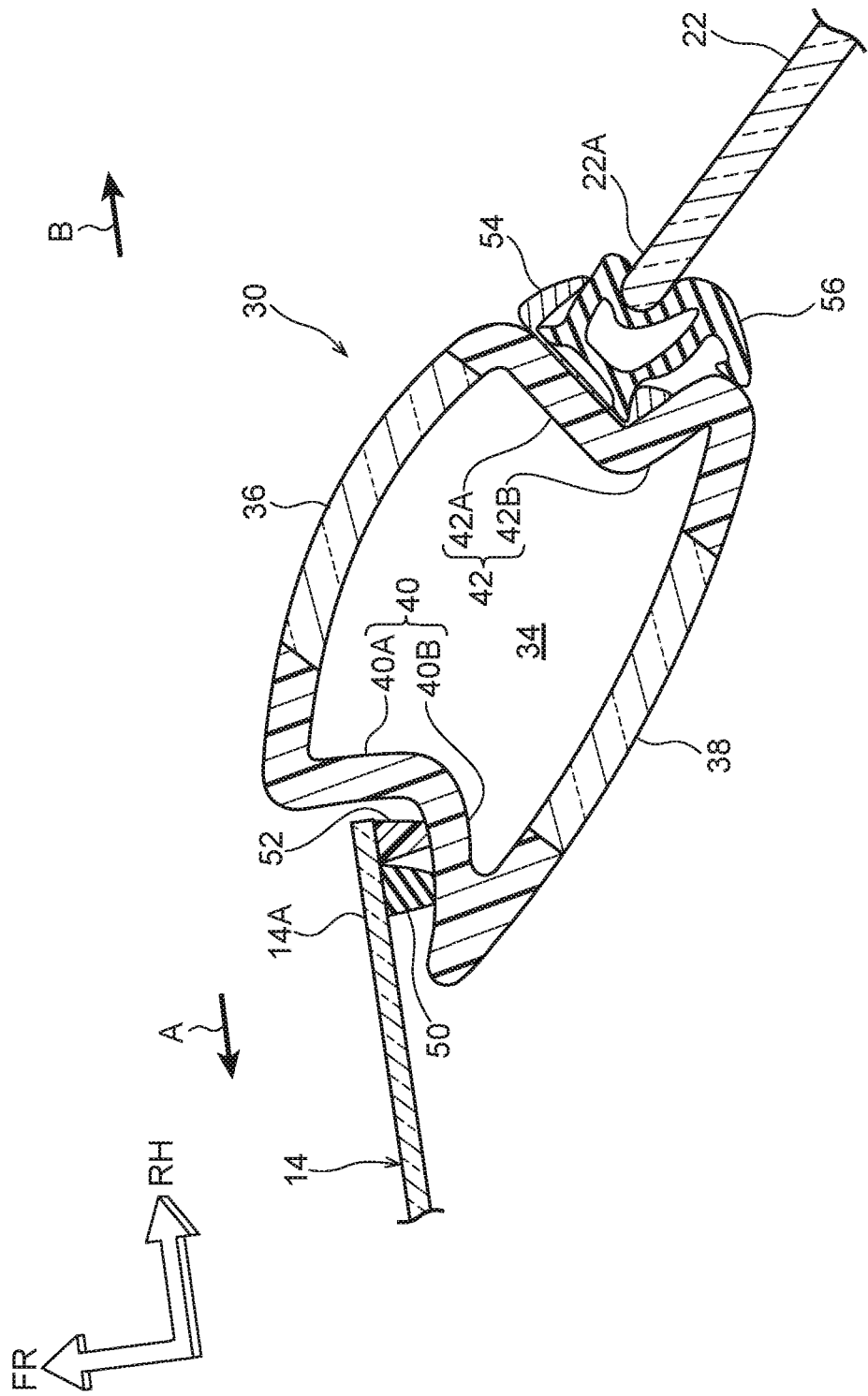
FIG. 9 is a cross-sectional view a pillar manufactured using a 3D printer, in accordance with some embodiments.

In some embodiments, at least one portion of the front pillar 30 comprises one or more of a resin material that is transparent, a glass fiber reinforced resin that is transparent, a carbon fiber reinforced resin that is black, or some other suitable material with or without fibers, and one or more other portions of the front pillar 30 comprises one or more of resin material that is transparent, a glass fiber reinforced resin that is transparent, a carbon fiber reinforced resin that is black, or other suitable material with or without fibers that is different from the material included in the at least one portion of the front pillar 30. For example, as shown in FIG. 9, the transverse direction intermediate portions of the outer side wall 36 and the inner side wall 38 (the portions, other than the transverse direction both end portions, at the outer side wall 36 and the inner side wall 38), in some embodiments, comprise a glass fiber reinforced resin, and the other portions of the front pillar 30, in some embodiments, comprise a carbon fiber reinforced resin that is black. In this case, third nozzles, that serve as "nozzles" and that discharge the carbon fiber reinforced resin, are provided at the nozzle head 72 of the 3D printer 60.

In some embodiments, the method of manufacturing the front pillar 30 is discussed with respect to the front pillar 30 that is disposed at the front portion of the cabin C. In some embodiments, the method of manufacturing the front pillar 30 is generally applicable for manufacturing a pillar for other positions in the vehicle V in some embodiments, the method of manufacturing a pillar is applicable for manufacturing one or more of a rear pillar that is disposed between a rear windshield glass, that is provided at the rear portion of the cabin C, and a side door glass, that is provided at a side portion of the cabin C, or some other suitable position in vehicle V. In this case, the tensile strength in the length direction of the rear pillar, or the pillar for the other suitable position in the vehicle V, is made to be higher than a pillar made by way of injection molding.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method of manufacturing a resin pillar configured to extend along a windshield glass of a vehicle, the method comprising:
    forming a first resin layer by discharging a transparent fiber reinforced resin material that forms the resin pillar from first nozzles of a 3D printer and discharging a supporting material from second nozzles of the 3D printer, while moving the first nozzles and the second nozzles in a direction corresponding to a length direction of the resin pillar;
    relatively moving the first nozzles and the second nozzles in a direction corresponding to a transverse direction of the resin pillar so as to move away from the first resin layer after the forming of the first resin layer; and
    forming a plurality of subsequent resin layers over the first resin layer by repeating the discharging of the transparent fiber reinforced resin material and the discharging of the supporting material while moving the first nozzles and the second nozzles in the direction corresponding to the length direction of the resin pillar, and repeating the relative moving of the first nozzles and the second nozzles in the direction corresponding to the transverse direction of the resin pillar such that the plurality of subsequent resin layers are stacked upon one another in sequence,
    wherein
        the plurality of subsequent resin layers are stacked upon one another in a direction that is orthogonal to a plate thickness direction of the windshield glass as seen from the length direction of the resin pillar when the windshield glass and the resin pillar are in an assembled state, and
        the discharging of the transparent fiber reinforced resin material while moving the first nozzles in the direction corresponding to the length direction of the resin pillar causes fibers included in the transparent fiber reinforced resin material to be arranged such that a length direction of the fibers included in the transparent fiber reinforced resin material extend in the length direction of the resin pillar.

2. The method of manufacturing the resin pillar of claim 1, further comprising:
    removing the supporting material,
    wherein the first resin layer and the plurality of subsequent resin layers are stacked such that upon removal of the supporting material, the resin pillar is a hollow structure having a closed cross-section in a cross-sectional view seen from the length direction of the resin pillar.

3. The method of manufacturing the resin pillar of claim 1, further comprising:
    removing the supporting material,
    wherein the first resin layer and the plurality of subsequent resin layers are stacked such that upon removal of the supporting material, the resin pillar is a solid structure in a cross-sectional view seen from the length direction of the resin pillar.

4. The method of manufacturing the resin pillar of claim 1, wherein in the forming of the first resin layer and the plurality of subsequent resin layers, the transparent fiber reinforced resin material is discharged to form layers that correspond to a cross-sectional shape of the resin pillar, and the supporting material is discharged so as to surround the layers that correspond to the cross-sectional shape of the resin pillar.

5. The method of manufacturing the resin pillar of claim 1, wherein each of the first resin layer and the plurality of subsequent resin layers has a thickness in the transverse direction of the resin pillar, and relatively moving the first nozzles and the second nozzles in the direction corresponding to the transverse direction of the resin pillar comprises moving the first nozzles and the second nozzles from a first position with respect to the closer of the first resin layer or a closest subsequent resin layer of the plurality of subsequent resin layers to a second position that is a distance away from the first position equal to the thickness of each of the first resin layer and the plurality of subsequent resin layers in the transverse direction of the resin pillar.

6. The method of manufacturing a resin pillar of claim 1, wherein, in the forming of the first resin layer and the plurality of subsequent resin layers, a water-soluble material is used as the supporting material.

7. The method of manufacturing a resin pillar of claim 6, wherein
one portion of the resin pillar comprises a glass fiber reinforced resin or a carbon fiber reinforced resin, and
another portion of the resin pillar comprises a different material than that which forms the one portion of the resin pillar, the different material being the other of the glass fiber reinforced resin or the carbon fiber reinforced resin, or a transparent material free from including reinforcement fibers.

8. The method of manufacturing the resin pillar of claim 1, wherein the plurality of subsequent resin layers are stacked upon one another in the transverse direction of the resin pillar.

9. The method of manufacturing the resin pillar of claim 8, wherein each of the first resin layer or the plurality of subsequent resin layers includes a single resin layer comprising the transparent fiber reinforced resin material adjacent to the supporting material.

* * * * *